US009007352B2

(12) United States Patent
Senatori

(10) Patent No.: US 9,007,352 B2
(45) Date of Patent: Apr. 14, 2015

(54) PORTABLE COMPUTER HAVING A TILT CAMERA ASSEMBLY

(75) Inventor: Mark David Senatori, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 368 days.

(21) Appl. No.: 13/259,999

(22) PCT Filed: Dec. 10, 2009

(86) PCT No.: PCT/US2009/067440

§ 371 (c)(1),
(2), (4) Date: Sep. 23, 2011

(87) PCT Pub. No.: WO2011/071496

PCT Pub. Date: Jun. 16, 2011

(65) Prior Publication Data

US 2012/0013584 A1 Jan. 19, 2012

(51) Int. Cl.
*G06F 3/038* (2013.01)
*G09G 5/00* (2006.01)
*G06F 1/16* (2006.01)

(52) U.S. Cl.
CPC ............ *G06F 1/1686* (2013.01); *G06F 1/1616* (2013.01)

(58) Field of Classification Search
CPC ............................ G06F 1/1616; G06F 1/1686
USPC ............ 345/207; 348/335, 373; 455/90, 351, 455/566, 575
See application file for complete search history.

(56) References Cited

U.S. PATENT DOCUMENTS

| | | | | |
|---|---|---|---|---|
| 6,141,052 | A | 10/2000 | Fukumitsu et al. | |
| 2003/0125094 | A1 * | 7/2003 | Hyun et al. | 455/566 |
| 2005/0276009 | A1 | 12/2005 | Kim | |
| 2006/0197863 | A1 * | 9/2006 | Kim | 348/335 |
| 2006/0268157 | A1 * | 11/2006 | Chang | 348/373 |
| 2008/0144156 | A1 * | 6/2008 | Goodman et al. | 359/226 |

FOREIGN PATENT DOCUMENTS

| | | |
|---|---|---|
| CN | 1391420 | 1/2003 |
| CN | 1829426 | 9/2006 |

(Continued)

OTHER PUBLICATIONS

PCT: "Notification of Transmittal of the International Search Report and the Written Opinion of the International Searching Authority, or the Declaration", PCT/US2009/067440; Aug. 24, 2010; 10 pages.

(Continued)

*Primary Examiner* — Kevin M Nguyen
*Assistant Examiner* — Insa Sadio
(74) *Attorney, Agent, or Firm* — Trop, Pruner & Hu, P.C.

(57) ABSTRACT

Embodiments of the present invention provide a digital camera mount assembly for a portable computer 200 having a display panel 202. According to one embodiment, the camera mount assembly 206 includes a mount plate having at least one aperture and formed within a front surface 203 of the display panel. A tiltable camera lens is positioned within the aperture of the camera housing. In particular, the camera lens is configured such that when the camera lens is tilted at a maximum, the camera lens does not protrude outside the front surface of the display panel.

17 Claims, 5 Drawing Sheets

(56) References Cited

FOREIGN PATENT DOCUMENTS

| | | | |
|---|---|---|---|
| KR | 1020100037837 | A | 4/2010 |
| TW | 278921 | | 10/2005 |

OTHER PUBLICATIONS

Chinese Office Action issued in Chinese Appl. No. 200980161791.3 dated Feb. 18, 2014; 7 pages.

* cited by examiner

PORTABLE COMPUTER HAVING A TILT CAMERA ASSEMBLY

CROSS-REFERENCE TO RELATED APPLICATION

This application is a national stage application under 35 U.S.C. §371 of PCT/US2009/067440, filed Dec. 10, 2009.

BACKGROUND

Modern portable computers are equipped with a plethora of features and components that have enabled these mobile devices to become popular and useful everyday computing tools. Such standard features and components include wireless network connectivity, bluetooth synchronization, digital video disc drives, and front-mounted digital video cameras. In particular, digital video cameras are typically utilized for taking snap shots of a user or for video conferencing with other users from around the world.

When implemented in portable computers, a digital video camera is generally positioned around a top area of the display panel of the portable computer. Since the display panel is pivotable and may be positioned at various angles with respect to the base housing of the portable computer, the viewing angle and the field of view of the digital camera is also affected. As a result, the user will sometimes need to adjust his relative sitting position to effectively view the image on the display, possibly leaving the digital camera's field of view. By the same measure, the user will sometimes need to adjust his sitting position to get within the field of view of the digital camera, only to have an undesirable viewing angle of the display. Accordingly, it is often difficult to place both the display panel and digital camera at optimum viewing angles or positions with respect to the operating user.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 3A is a front view of the tilt camera assembly, while

DETAILED DESCRIPTION OF THE INVENTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Conventional computer camera mount systems use a separate camera mounting module that requires the entire module to rotate such that a pivot axis of the module lies near the rear surface of the display panel. Consequently, additional wall thickness of the display panel is required to support to mount itself, as well as additional thickness to support the rotating camera module. Furthermore, rotation of the conventional camera mount system requires the lens aperture to have more clearance in the front panel. Since the entire camera module rotates as a unit, circuitry and cabling needs to be routed through the aperture and pivot point, further complicating the pivot movement of the camera mount system.

Embodiments of the present invention provide a tilt camera assembly and tilt mechanism for a portable computer. Particularly, the camera assembly is mounted to the front surface of the display panel, and an axis of rotation of its camera lens is proximate to the front surface of the display panel such that the camera lens does not protrude from the front surface even at a maximum tilt angle. Furthermore, the articulation of the rotation of the camera lens is easily accomplished via a slider positioned adjacent to the camera lens.

Figure 1:
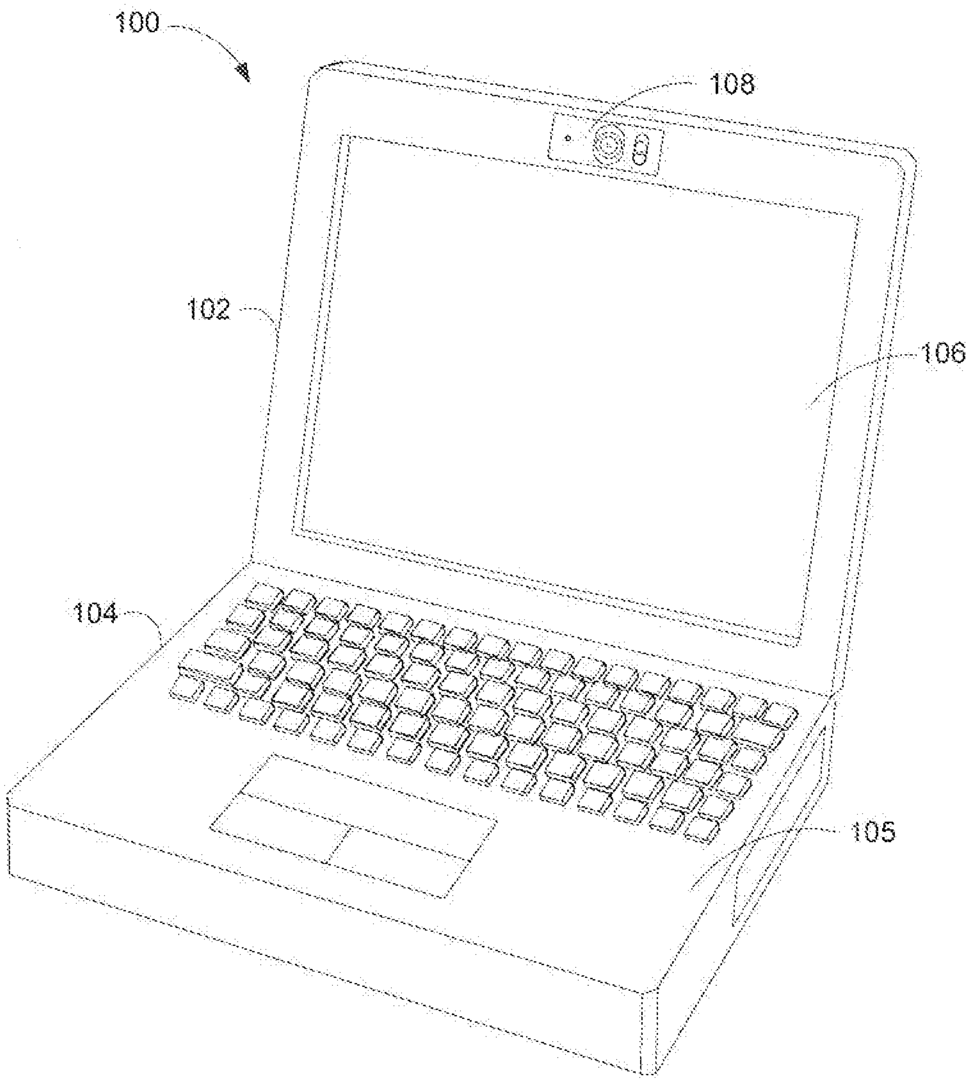
FIG. 1 is a three-dimensional perspective view of a notebook computer having a mounted tilt camera assembly according to an embodiment of the present invention.

Since the pivot axis of the camera lens is placed proximate to the front surface of the display panel, the display panel can have a slim profile with no external protrusion from the camera assembly. Still further, such a configuration allows the camera assembly to tilt or pane, with a minimum aperture opening on the front surface of the display panel. Moreover, by positioning the pivot axis close to this surface, the size of internal circuitry required for pivot movement can be reduced, allowing for a simpler and cleaner design of the camera assembly Referring now in more detail to the drawings in which like numerals identify corresponding parts throughout the views, FIG. 1 is a three-dimensional perspective view of a notebook computer having a mounted tilt camera assembly according to an embodiment of the present invention. As shown here, notebook computer 100 includes a top housing or flat display panel 102 connected to a lower housing 104 via a pivot mechanism, or hinge for example. The display panel 102 includes a display 106 and a tilt camera assembly 108 formed in a center region above the display 106. The display 106 may be a liquid crystal display, light emitting diode display, organic light-emitting diode display, or the like. The camera assembly 108 represents a mechanical tilting construction and a digital camera, which is configured to digitally record images via an electronic sensor and reproduce the images on the display 106. A more detailed description of the tilt camera assembly will be in described in further detail below.

Figure 2:
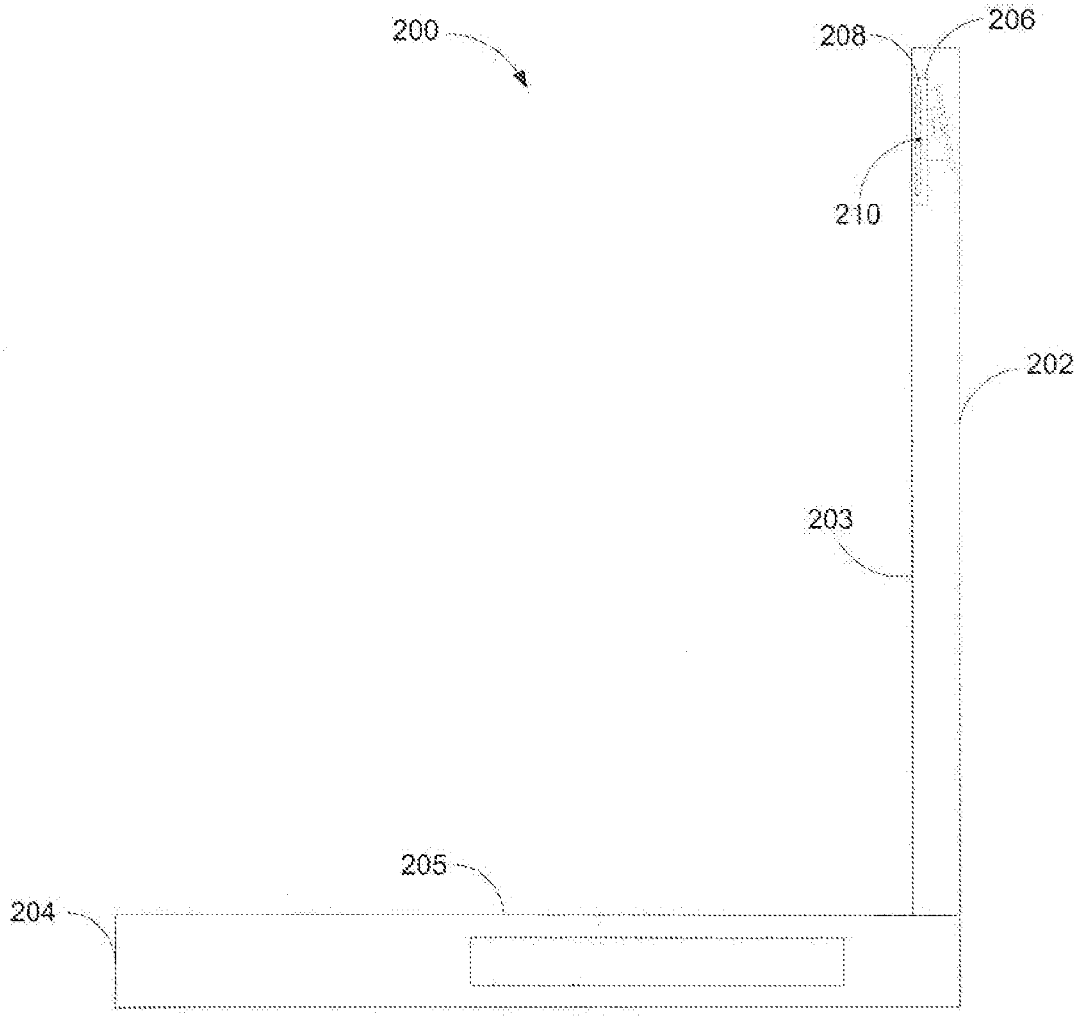
FIG. 2 is a side view of the notebook computer and tilt camera assembly according to an embodiment of the present invention.

FIG. 2 is a side view of the notebook computer and tilt camera assembly according to an embodiment of the present invention. According to the present embodiment, the notebook computer 200 includes a display panel 202 and a lower housing 204 connected thereto. The display panel 202 includes a display front surface 203, and the lower housing 204 includes a front input surface 205 that faces the display front surface 203. As shown here, tilt camera assembly 206 is mounted within a top area of display panel 202 and includes a camera lens 208. Moreover, the camera lens 208 pivots about an axis of rotation 210 that is immediately adjacent to the display front surface 203. Since the camera lens 208 rotates individually without a rotational shaft, less wall thickness is required for housing the camera assembly 206, thereby allowing the flat display panel 202 to maintain a slim and light design.

Figure 3A:
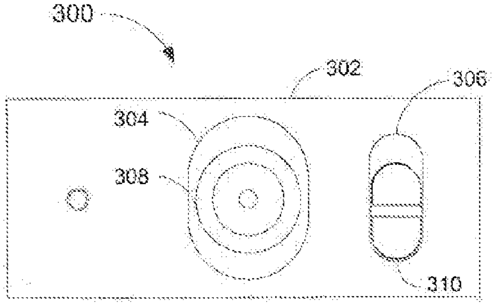
Figure 3B:
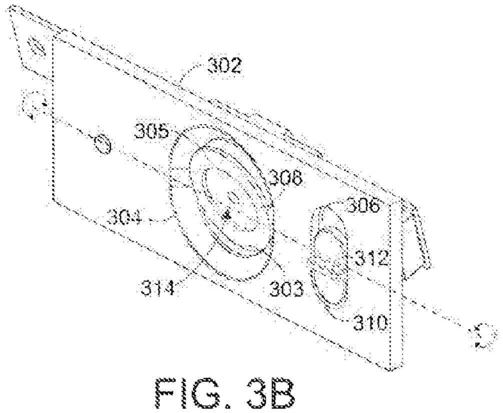
FIGS. 3B-3D are three-dimensional perspective views of the tilt camera assembly according to an embodiment of the present invention.

FIGS. 3A-3D are various views of the tilt camera assembly according to embodiments of the present invention. FIG. 3A is a front view of the tilt camera assembly 300. As shown here, the tilt camera assembly includes a mount plate 302 having a lens aperture 304 for enclosing a camera lens 308, and a smaller slider aperture 306 that encloses a slider 310 configured to tilt the camera lens 308. FIG. 3B is a three-dimensional view of the tilt camera assembly 300. In the present embodiment, the slider 310 includes a tab portion 310 for vertically moving the slider 308 within the aperture 306. As shown here, the slider 308 is in a down position, or positioned in a lower area of the slider aperture 306. Accordingly, the camera lens 308 is also positioned in a downward facing position within the lens aperture 302. That is, the camera lens 308 is tilted vertically downward such that a top position 305 of the camera lens 308 is closer to the front surface of the display panel than a bottom position 303 of the camera lens 308.

Figure 3C:
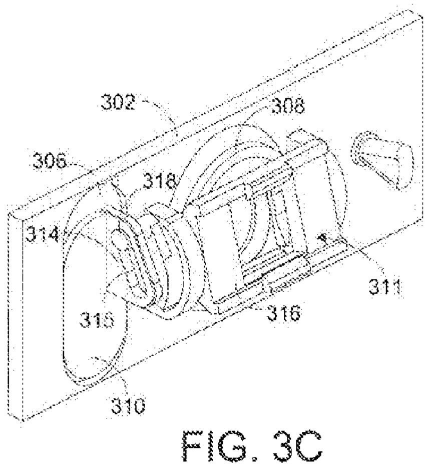
Figure 3D:
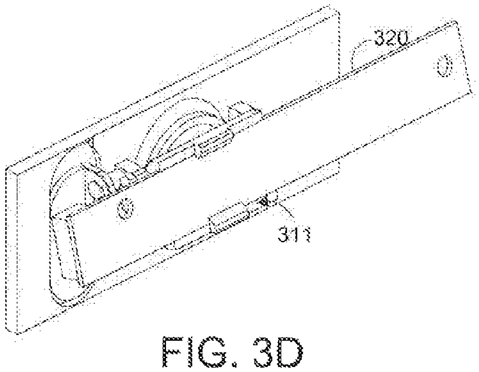

Turning now to FIG. 3C, the tilt camera assembly 300 includes a camera lens 304, a lever portion 318, and arch member 316. The arch member 316 is coupled to both the lever portion 318 and the camera lens 308. In addition, the slider 310 is connected to a follower member 314. The follower member 314 includes an inclined aperture 315 for enclosing and moving the lever portion 318 along the inclined track of aperture 315. When the slider 310 is repositioned within the slider aperture 306, either by user movement of a tab portion 312 or by automatic adjustment, the following member 314 moves accordingly so as to move the lever portion 318 along the track of the inclined aperture 315. A detailed explanation of the tilt mechanism will be described with reference to FIGS. 4A-4C. The camera assembly also includes a printed circuit board (PCB) 320 for providing electronic operation of the digital camera as shown in FIG. 3D. In this illustrative example, the PCB 320 is attached to the rear side of the arch member 316, or a side away from the front surface of the display panel.

Figure 4C:
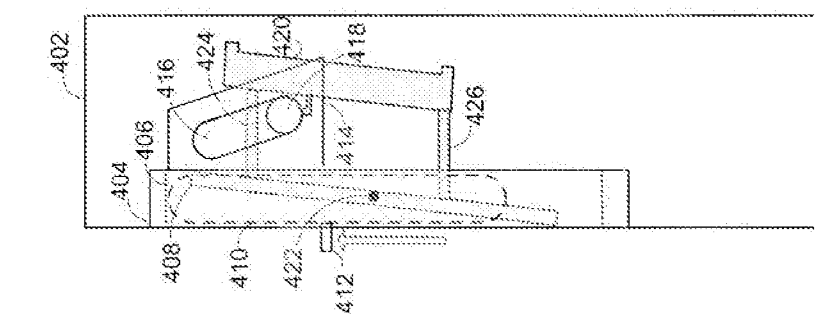
FIGS. 4A-4C are side profile views of the tilt camera assembly and tilt mechanism according to an embodiment of the present invention.
Figure 4B:
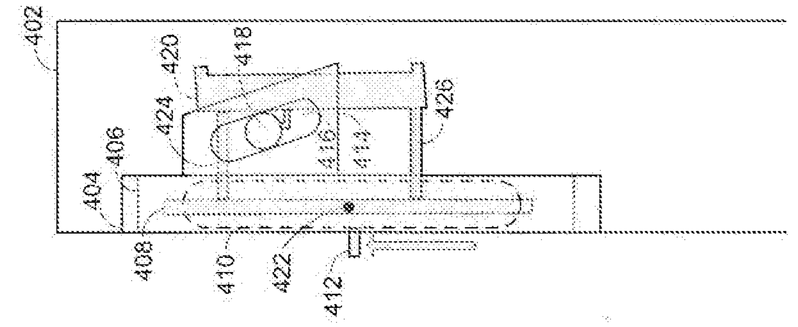
Figure 4A:
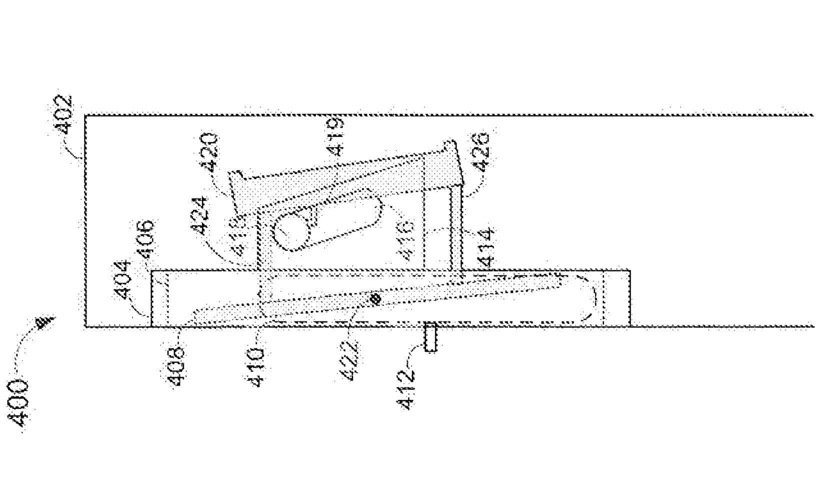

FIGS. 4A-4C are side profile views of the tilt camera assembly and tilt mechanism according to an embodiment of the present invention. The exemplary embodiment shown in FIG. 4A depicts a display panel 402 for housing a camera mount assembly 403. The camera mount assembly 403 includes mount plate 404, slider 410, follower member 414, arch member 420, and camera lens 408. Camera mount plate 404 is formed to be integral and vertically-aligned with the front surface of the display panel 402, and includes an aperture 406 for enclosing camera lens 408. According to one embodiment, slider 410 is configured to move vertically within mount plate 404 and includes a tab portion 412 for facilitating manual movement by a user. Furthermore, a follower member 414 is directly coupled to the slider 410 and is configured to move vertically along the rear side of the mount plate 404 in accordance with movement of the slider 410. The follower member 414 includes an inclined aperture 416 for enclosing a lever portion 418. The lever portion is connected via connecting means 419 to an arch member 420. This arch member 420 is coupled to a rear side of the camera lens and is configured to vertically arch or tilt the camera lens 408 within aperture 406.

FIG. 4B is an illustration depicting movement of the slider 408 of the camera assembly 403. Here, the slider 408 is repositioned and moved upward via tab 412 as indicted by the directional arrow. When this movement occurs, the follower member 414 moves and follows the slider member upward, causing the lever portion 418 to slide downwards along the track of the inclined aperture 416. Accordingly, the connecting means 419 causes the arch member 420 to follow the lever portion and move to an upright position so as to be parallel to the slider 410 as shown in FIG. 4B. Correspondingly, lower connecting portion 424 pushes the bottom area of the camera lens 408 toward the front surface of display panel 402, while top connecting portion 426 pulls the top area of the camera lens 408 away from the front surface of the display panel 402. As a result, the camera lens 408 is brought to an upright, non-tilted position within aperture 406 of the mount plate 404.

FIG. 4C is another illustration that depicts movement of the slider 408 of the camera assembly 403. As shown in this exemplary embodiment, the slider 408 is repositioned and moved further upward via tab 412 as indicted by the directional arrow. When this movement occurs, the follower member 414 moves and follows the slider member causing the lever portion 418 to slide along the inclined aperture 416 to a bottom potion of the aperture 416. Such movement also causes the arch member 420 to follow the lever portion via connecting means 419 so as to place the arch member 420 in a downward sloping position as shown in FIG. 4C. Correspondingly, the connecting portion 424 pushes the bottom area of the camera lens 408 further toward the front surface of display panel 402, while connecting portion 426 pulls the top area of the camera lens 408 further away from the front surface of the display panel 402. As a result, the camera lens 408 is brought to an upward tilted position within aperture 406 so as to provide an inclined viewing angle and field of view. A description of the different viewing angles and field of views will be described in further detail with references to the FIGS. 5A-5C.

FIGS. 4A and 4C depict maximum tilt angles of the camera lens 408. A shown here, a feature of the camera assembly according to embodiments of the present invention is that even at a maximum tilt angle, the camera lens 408 does not vertically-extend outside aperture 406. In a particular embodiment, the camera lens 408 is not tilted more than 15 degrees in order to prevent any portion of the camera lens 408 from protruding outside the front surface of the display panel 402. According to one embodiment, a 15 degree downward or upward tilt of camera lens 408 allows for sufficient alteration of the camera's field view while minimizing the potential of the camera's field of view being impeded by an inner surface area of the display housing.

Figure 5C:
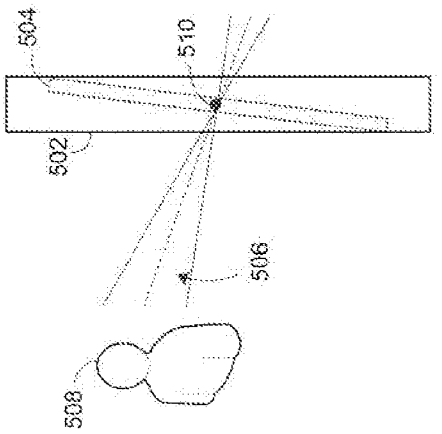
FIGS. 5A-5C are illustrations of different field of views associated with the camera lens according to embodiments of the present invention.
Figure 5B:
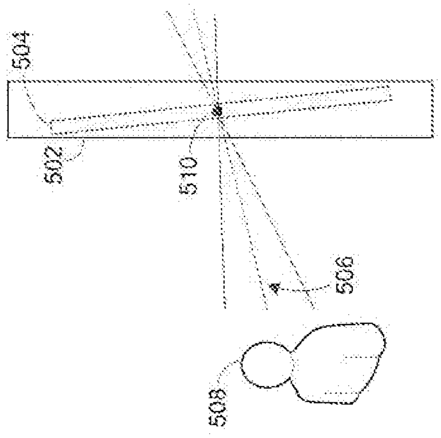
Figure 5A:
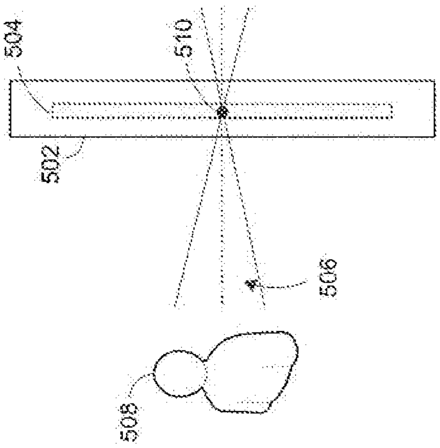

FIG. 5A depicts a standard field of view 506. As shown here, the camera lens 504 is an upright or non-tilted position within aperture 504. Accordingly, the field of view 506 extends perpendicularly from the aperture 502 so as to provide a centralized line of sight for users 508 positioned eye-level with the pivot axis 510 of the camera lens 504. FIG. 5B depicts an alternate angled field of view 506. In this embodiment, the camera lens 504 lies in a downward sloped position within aperture 504. As such, the field of view 506 extends downward from the aperture 504 so as to provide a centralized viewing angle for a user 508 positioned below the pivot axis 510 of the camera lens 504. FIG. 5C depicts yet another angled field of view 506. As shown here, the camera lens 504 rests in an upward sloped position within aperture 504, causing the field of view 506 to extend downward from the aperture 504. Accordingly, a centralized viewing angle can be provided for a user 508 positioned above the pivot axis 510 of the camera lens 504.

Embodiments of the present invention provide a tiltable camera mount assembly for a portable computer. In particular, the camera mount assembly provides a camera lens having a pivot axis that is proximate to the front surface of a display panel of a portable computer. The camera lens tilts so as to provide different field of views for the user without further movement of the display panel of the portable computer. Moreover, the entire tilt camera assembly operates with a small number of parts and circuitry, thereby allowing for a more robust and compact design and easier implementation within the portable computer.

Several advantages are afforded by the camera assembly and tilt camera mechanism of the embodiments of the present invention. For example, the camera lens of the camera assembly has an axis of rotation that is proximate to the front surface of the display panel such that rotation of the camera lens rotation is accomplished without a rotational shaft as required in the conventional camera mount systems. In addition, the camera assembly and camera lens can tilt vertically within a small aperture opening in the front surface of the display panel. Furthermore, the front display panel can have a slim profile design without external protrusion or interference from the camera lens and camera assembly. Moreover, internal circuitry and routing necessary for camera rotation and operation can be reduced and simplified.

While the invention has been described with respect to exemplary embodiments, one skilled in the art will recognize that numerous modifications are possible. For example, although exemplary embodiments depict a notebook computer as a portable computer, the invention is not limited thereto. For example, the portable computer may be a netbook, a tablet personal computer, a smart phone, or any other portable computing device capable of housing a digital camera. Furthermore, the camera assembly may be implemented and installed directly on the front display panel without the presence of the mount plate. In addition, the slider used to manifest rotation of the camera lens may be any type of lever, button, or other physical activation means for affecting the tilt mechanism of the camera lens. Conversely, the camera lens may be configured to pivot and tilt automatically, i.e. without physical movement of a slider or other external movement means formed on the surface of the display panel. Though the camera lens is described as tilting along a horizontal pivot axis, the camera lens maybe configured to tilt along any pivot axis proximate to the front surface of the display panel.

Thus, it is to be understood that the above description is intended to be illustrative, and not restrictive. Many other embodiments will be apparent to those of skill in the art upon reviewing the above description. The scope of the invention should therefore, be determined with reference to the appended claims along with the full scope of equivalents to which such claim are entitled.

What is claimed is:

1. A portable computer comprising:

a display panel; and a digital camera assembly including:

- a camera mount plate including a planar face, the planar face having a first aperture, the mount plate formed within a front surface of the display panel;
- a tiltable camera lens enclosed within the first aperture of the camera mount plate, wherein the camera lens does not protrude outside the front surface of the display panel when at a maximum tilted position;
- a slider aperture in the planar face of the mount plate; and
- a movable slider slideable in the slider aperture and including a tab portion operable by a user, the movable slider configured to vertically tilt the camera lens a predetermined amount of degrees in response to sliding movement of the slider in the slider aperture.

2. The portable computer of claim 1, wherein the camera lens is tilted within the first aperture up to an angle of 15 degrees with respect to the planar face.

3. The portable computer of claim 1, wherein the digital camera assembly further includes a follower member having an inclined aperture formed therein, the follower member attached to a rear side of the moveable slider.

4. The portable computer of claim 3, wherein the digital camera assembly further includes:

- a lever portion coupled to an arch member configured to vertically tilt the camera lens, the lever portion moveable along the inclined aperture in response to the sliding movement of the slider.

5. The portable computer of claim 4, wherein the lever portion slides within the inclined aperture of the follower member in response to the sliding movement of the slider such that sliding movement of the slider moves the lever portion of the camera assembly along the inclined aperture so as to reposition the arch member and viewing angle of the camera lens.

6. The portable computer of claim 1, wherein at the maximum tilted position the camera lens is at a maximum vertical angle with respect to the planar face of the mount plate.

7. The portable computer of claim 1, wherein the tab portion of the slider protrudes through the slider aperture, and wherein user operation of the tab portion causes the sliding movement of the slider in the slider aperture.

8. A method for adjusting a viewing angle of a digital camera assembly mounted on a display panel of a portable computer, the method comprising:

- activating a moveable slider of a tilting mechanism of the digital camera assembly, and
- in response to activating the slider of the tilting mechanism, tilting a camera lens of the digital camera assembly within a first aperture of a mount plate in the display panel such that the camera lens does not protrude outside the first aperture of the display panel when at a maximum tilted position, the first aperture formed in a planar face of the mount plate, and the planar face further having a second aperture in which the slider slides in response to user operation of the slider, the sliding of the slider in the second aperture causing vertical tilting of the camera lens a predetermined amount of degrees.

9. The method of claim 8, wherein the camera lens is tilted within the first aperture up to an angle of 15 degrees by the sliding movement of the slider in the second aperture.

10. The method of claim 8, wherein the movable slider is coupled to a follower member having an inclined aperture.

11. The method of claim 10, wherein the camera assembly includes a lever portion coupled to an arch member configured to vertically tilt the camera lens, the lever portion moveable along the inclined aperture in response to the sliding movement of the slider in the second aperture.

12. The method of claim 11, wherein the lever portion of the camera assembly slides within the inclined aperture such that the sliding movement of the slider moves the lever portion of the camera assembly along the inclined aperture so as to reposition the arch member and viewing angle of the camera lens.

13. The method of claim 8, wherein the slider includes a tab portion protruding through the second aperture, wherein activating the slider is in response to user actuation of the tab portion.

14. The method of claim 13, wherein sliding movement of the slider in the second aperture in response to the user actuation of the tab portion operates the tilting mechanism to tilt the camera lens within the first aperture.

15. A digital camera assembly for a portable computer having a display panel, the digital camera assembly comprising:

a camera mount plate including a planar face, the planar face having a first aperture, the mount plate to be placed within a front surface of the display panel of the portable computer;

a tiltable camera lens enclosed within the first aperture of the camera mount plate;

a slider aperture in the planar face of the mount plate; and a movable slider slideable in the slider aperture when operated by a user and configured to vertically tilt the camera lens a predetermined amount of degrees, wherein an axis of rotation of the tiltable camera lens is proximate to the front surface of the display panel such that the camera lens does not protrude outside the front surface of the display panel when at a maximum tilted position.

16. The digital camera assembly of claim 15, wherein the slider includes a tab portion extending through the slider aperture, the tab portion operable by the user to slide the slider in the slider aperture.

17. The digital camera assembly of claim 16, further comprising a tilting mechanism coupling the slider to the camera lens.

* * * * *

UNITED STATES PATENT AND TRADEMARK OFFICE

CERTIFICATE OF CORRECTION

PATENT NO. : 9,007,352 B2
APPLICATION NO. : 13/259999
DATED : April 14, 2015
INVENTOR(S) : Mark David Senatori It is certified that error appears in the above-identified patent and that said Letters Patent is hereby corrected as shown below:

Title Page

On the face page, in item (74), Attorney, in column 1, line 2, after "Trop, Pruner & Hu, P. C." insert -- Hewlett-Packard Patent Department --, therefor.

Signed and Sealed this
Twenty-seventh Day of October, 2015

Michelle K. Lee
*Director of the United States Patent and Trademark Office*